United States Patent
Takeuchi

(10) Patent No.: US 8,606,561 B2
(45) Date of Patent: Dec. 10, 2013

(54) COMPOSING A REPLY TO A TEXT MESSAGE RECEIVED IN A MESSAGING APPLICATION

(75) Inventor: Mayo Takeuchi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1711 days.

(21) Appl. No.: 11/424,648

(22) Filed: Jun. 16, 2006

(65) Prior Publication Data

US 2007/0124132 A1    May 31, 2007

(30) Foreign Application Priority Data

Nov. 30, 2005 (GB) .................................. 0524354.8

(51) Int. Cl.
*G06F 17/20* (2006.01)
*G06F 17/28* (2006.01)

(52) U.S. Cl.
USPC ....................................... 704/8; 704/2; 704/3

(58) Field of Classification Search
None
See application file for complete search history.

(56) References Cited

U.S. PATENT DOCUMENTS

| | | | |
|---|---|---|---|
| 5,523,754 A * | 6/1996 | Eisen et al. | 341/20 |
| 6,157,905 A * | 12/2000 | Powell | 704/2 |
| 6,182,099 B1 * | 1/2001 | Nakasato | 715/236 |
| 6,469,713 B2 * | 10/2002 | Hetherington et al. | 715/740 |
| 6,539,118 B1 * | 3/2003 | Murray et al. | 382/229 |
| 6,704,698 B1 * | 3/2004 | Paulsen et al. | 704/1 |
| 7,191,114 B1 * | 3/2007 | Murray et al. | 704/2 |
| 2002/0059448 A1 * | 5/2002 | Honeywood | 709/238 |
| 2004/0036632 A1 * | 2/2004 | Ford | 341/22 |
| 2004/0102956 A1 * | 5/2004 | Levin | 704/2 |
| 2004/0260536 A1 * | 12/2004 | Hwang | 704/9 |

FOREIGN PATENT DOCUMENTS

JP        2001337894 A  *  12/2001

* cited by examiner

*Primary Examiner* — Jesse Pullias
(74) *Attorney, Agent, or Firm* — David A. Dagg

(57) ABSTRACT

A method, system and computer program product for composing a reply to a text message received in a messaging application and automatically changing the settings of an input method editor are provided. The language of a received text message is determined and compared to a current input language of the input method editor. The input language of the input method editor is automatically changed to the determined language for the input of a reply to the received message by a user.

9 Claims, 3 Drawing Sheets

COMPOSING A REPLY TO A TEXT MESSAGE RECEIVED IN A MESSAGING APPLICATION

CROSS REFERENCE TO RELATED APPLICATIONS

The present application claims priority under 35 USC 119 to United Kingdom Application Number GB0524354.8, filed Nov. 30, 2005.

FIELD OF THE INVENTION

The present invention relates to the field of data processing, and in particular to a method, system and computer program product for composing a reply to a text message received in a messaging application.

BACKGROUND OF THE INVENTION

Nowadays, the operating systems of computers support multiple languages. Typically, a large set of languages are installed as part of the Operating System (OS) installation, and additional languages may also be installed as required. With multiple languages installed on a computer, a user can compose documents that contain more than one language. Recipients of these documents must have the same languages installed on their computer to read or edit the documents. Many messaging systems, such as instant messaging (IM) and email applications, also support multiple languages. Examples are IBM® Sametime® and IBM Lotus® Notes®.

The ease with which character data is input into computer systems goes largely unnoticed by today's software users and, for that matter, by most software developers as well. The task of inputting characters is trivial for many scripts that have a small number of alphabetic characters, as is the case with the Latin script. When a script has a small number of characters, each character can be directly assigned to an individual key on a keyboard. To input a character one simply depresses the appropriate key. This strategy breaks down, however, when scripts, such as Japanese, possess a large number of characters. The challenge of inputting scripts with numerous characters requires that the keyboard be used in a different fashion than most users are accustomed to. The methodology that has been created to input these scripts is called an Input Method Editor (IME).

An IME acts as an intermediary between a software application and a user and allows computer users to enter complex characters and symbols, such as Japanese characters, using a non-Japanese input device. Operating System software typically includes standard IMEs that are based on the most popular input methods used in each target market. These include: Japanese, Korean, Chinese (which is subdivided into Traditional and Simplified), Greek, and Hebrew, as well as other scripts, such as those which use the Arabic or Cyrillic alphabets.

IMEs may simply carry out transliteration i.e. a mapping from one script system to another. For example, the user enters Latin characters via a Latin character keyboard or other input means, and the IME converts each character entered into a Cyrillic character. However, for more complex writing systems the composition of text may comprise more steps.

It is useful to take a look at one of the more complex writing systems, such as the Japanese writing system, before explaining how a user enters such characters using an IME. The entire Japanese written language comprises more than 50,000 characters, of which about 10,000 are in common use. The complexity of the characters and the large number of them requires some organization to simplify reading and writing. The Japanese writing system is organized into two categories: Kana and Kanji.

Kana is an alphabet of written phonetics or syllabary that represents Kanji. The Kana syllabary itself is further broken down into two subsets: Katakana and Hiragana both of which represent the same set of phonetic syllables. The Katakana set of phonetic syllables are written in an angular form and are used to represent names and words that come from foreign languages other than Chinese and Korean. The Hiragana characters are written in a cursive form and are used to represent all native Japanese phonemes and words.

Kanji characters are non-phonetic characters that represent ideas or concepts and that originate from Chinese ideographs. Kanji characters are commonly referred to as ideographs and are comprised of units, known as radicals, and other, non-radical units. For example, the radical 'rain' is used to construct the Kanji character for 'cloud'. Radicals themselves are constructed from even smaller units, called strokes, which are lines that are drawn in one continuous motion.

Using an IME and non-Japanese input device, the user composes each Japanese character in one of several ways: by radical, by stroke count, by phonetic representation, or by typing in the Japanese character's numeric encoding index.

Japanese input devices have Hiragana characters on the keys and combinations of Hiragana characters are lumped into potential matches for Kanji characters (there are lots of homonyms however). In Chinese input devices the keys represent radicals. A Han character is selected in response to the entry of a plurality of radicals in a particular order. The user of a computer system identifies to the OS of the computer system the language setting of the input device which is to be used with the computer. The OS can then identify the particular characters represented by keys selected by the user.

A problem exists in messaging systems, where a user is working in a first language, but receives a message in a second, different language. In this case, it makes sense for the user to reply to the sender in the language of the received message. Currently, the user has to change the IME settings manually before composing a reply message in the second language. This takes a number of steps which makes it slow and cumbersome for the user to respond.

The present invention aims to address this problem.

SUMMARY OF THE INVENTION

A first aspect of the invention provides a method of replying to a received text message in a messaging application using an input method editor. The method comprises determining the language of a received text message; comparing the determined language to the current input language of the input method editor; and automatically changing the input language of the input method editor to the determined language for the input of a reply to the received message.

This is achieved by providing an additional processing layer in the messaging application which automatically identifies the language used in an incoming textual message and switches the text input mode on a response window or text input box that the user opens to reply to the incoming text. Thus, the settings of an input method editor can be automatically changed in dependence on the identified language of the received message.

A second aspect of the present invention provides a method comprising receiving text of a received message, identifying the language of the received message; receiving user inputs identifying text characters for a reply message; and converting the received user inputs into text characters of the identified language.

A third aspect of the invention provides a system for composing a reply to a text message received in a messaging application. The system comprises a language identifying component for receiving text of a received message and identifying the language of the received message; an input method editor for converting user inputs into text characters; and a controller for controlling a language setting of the input method editor.

Preferably, the input method editor has an input language setting associated with each application running on the system, and the controller changes the input language setting associated with the messaging application in accordance with the language identified by the language identifying component.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
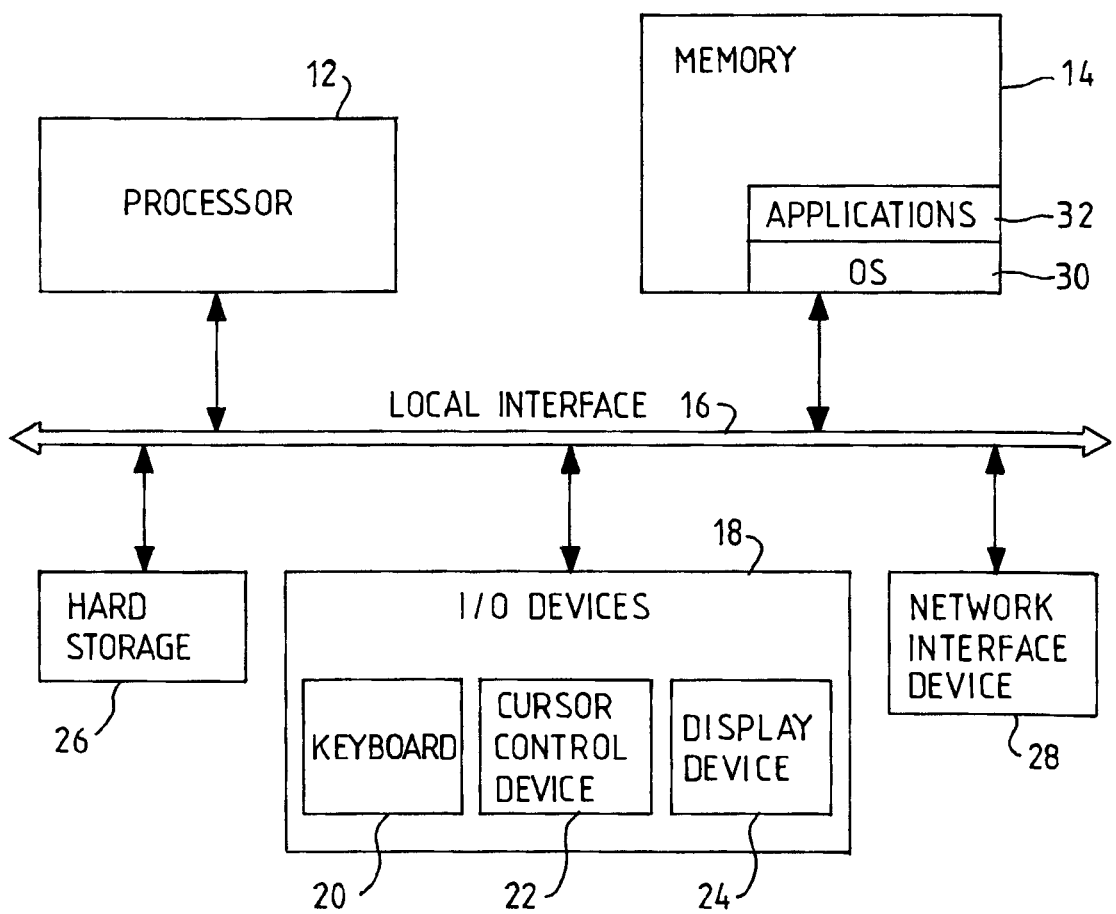
FIG. 1 shows a schematic representation of a data processing system according to an embodiment of the present invention.

Referring to FIG. 1, there is shown a schematic and simplified representation of a data processing system 10 in which the present invention may be implemented. As shown in FIG. 1, the data processing system comprises a processor (CPU) 12, and memory 14 coupled to a local interface 16. One or more user-input devices 18, such as a keyboard 20, cursor control device 22 and display device 24 are connected to the local interface 16. Additionally, hard storage 26 and a network interface device 28 are provided.

Illustrated within memory 14 in FIG. 1, are operating system (OS) 30 and applications 32 which are currently being run on the data processing system 10. The OS is a software (or firmware) component of the data processing system 10 which provides an environment for the execution of programs by providing specific services to the programs including loading the programs into memory and running the programs. The OS also manages the sharing of internal memory among multiple applications and/or processes and handles input and output control, file and data management, communication control and related services. Application programs make requests for services to the OS through an application program interface (not shown).

The data processing system 10 may comprise, for example, a personal computer (PC), laptop, server, workstation, or a portable computing device, such as a personal digital assistant (PDA), mobile telephone or the like. Furthermore, data processing system 10 may comprise additional components not illustrated in FIG. 1, and, in other embodiments, may not include all of the components illustrated in FIG. 1.

Referring again to FIG. 1, the various components of data processing system 10 will be described. The processor 12 may be a hardware device for executing software located in memory 14, and may be any custom made or commercially available processor, a central processing unit (CPU), a semiconductor based microprocessor, a macro processor, or generally any device for executing software instructions.

Memory 14 may include any one or combination of volatile memory elements (e.g., random access memory (RAM, such as DRAM, SRAM, SDRAM, etc.)) and non-volatile memory elements (e.g., ROM, hard drive, tape, CDROM, DVDROM etc.). Memory 14 may incorporate electronic, magnetic, optical, and/or other types of storage media. Memory 14 may also have a distributed architecture, with various components being situated remotely from one another, but being accessible by the processor 12.

Local interface 16 may be, for example, one or more buses or other wired or wireless connections and may comprise additional elements which are omitted for simplicity, such as controllers, buffers (caches), drivers, repeaters, and receivers. Further, local interface 16 may include address, control, and/or data connections to enable appropriate communications among components of the data processing system 10.

Input/output (I/O) devices 18 may comprise any device configured to communicate with local interface 16. In FIG. 1, a keyboard 20, cursor control device 22 and display device 24 are shown. Additional input/output devices such as optical drives, floppy disk drives, cameras, I/O ports, printers, speakers, microphones, scanners, etc. could also be provided.

Cursor control device 22 may comprise any input device configured to cooperate with an application 32 and/or OS 30 and manipulate one or more cursor(s) displayed on the display device 24. For example, cursor control device 22 may comprise, but is not limited to: a mouse, a trackball, a set of navigation keys (e.g., arrow keys), a touchpad, a joystick or a touch sensitive screen.

Network interface device 28 may be any device configured to interface between the data processing system 10 and a computer or telecommunications network, such as a local or wide area network, a private computer network, a public or private packet-switched or other data network including the Internet, a circuit switched network, or a wireless network. The data processing system shown in FIG. 1 may be connected to a network, such as the Internet for example, via the network interface device 28.

Email is a messaging system which enables the composing, sending, and receiving of messages over electronic communication systems and includes both Internet-based email systems, which use the Simple Mail Transfer Protocol (SMTP), as well as workgroup collaboration systems, which allow users within one company or organization to send messages to one another.

In a typical email application a user composes a new message using a mail user agent (MUA). The user types in, or selects from an address book, the email address of the intended recipient and then hits a 'send' button. The MUA formats the message and uses SMTP to send the message to a local mail transfer agent run by the user's Internet Service Provider (ISP). The message is then forwarded to the recipient's mailbox, though the recipient may have to press a 'receive mail' button on his MUA to download the message from his email server. Typically, an email will be displayed to a recipient along with a 'reply' button or the like, which the recipient can use to create a reply message. A new message box will appear into which the recipient can enter text in order to compose the reply message.

Many corporate email systems, such as IBM Lotus Notes or Microsoft® Exchange, have their own internal email format and their mail clients communicate with the email server using a proprietary protocol. The server sends or receives email via the Internet through the product's Internet mail gateway which also does any necessary reformatting.

Instant messaging applications differ from email applications in that conversations are able to happen in real time via an instant messaging service. When an instant message is received by a user a message window typically appears on the user's display, depending on the recipient's alerting options. This window usually includes a text input box into which the user can type a reply, which can be seen by the other party in the conversation as soon as the user hits the 'enter' key.

Figure 2:
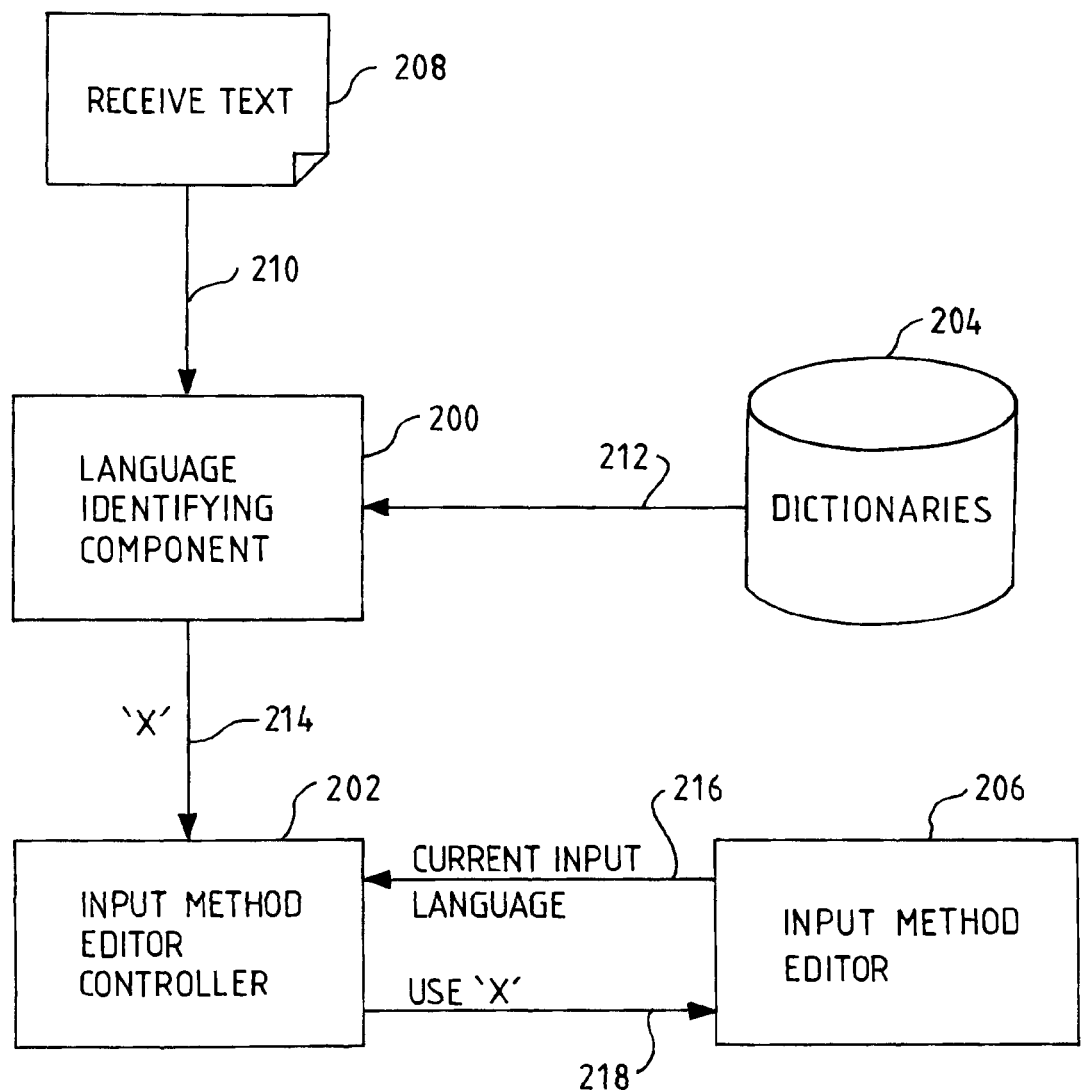
FIG. 2 shows the components of a system according to a preferred embodiment of the invention.

FIG. 2 shows the components of a system for automatically changing the input language of an input method editor. The system comprises a language identifying component 200, a controller 202, one or more dictionaries 204 and an input method editor 206.

Figure 3:
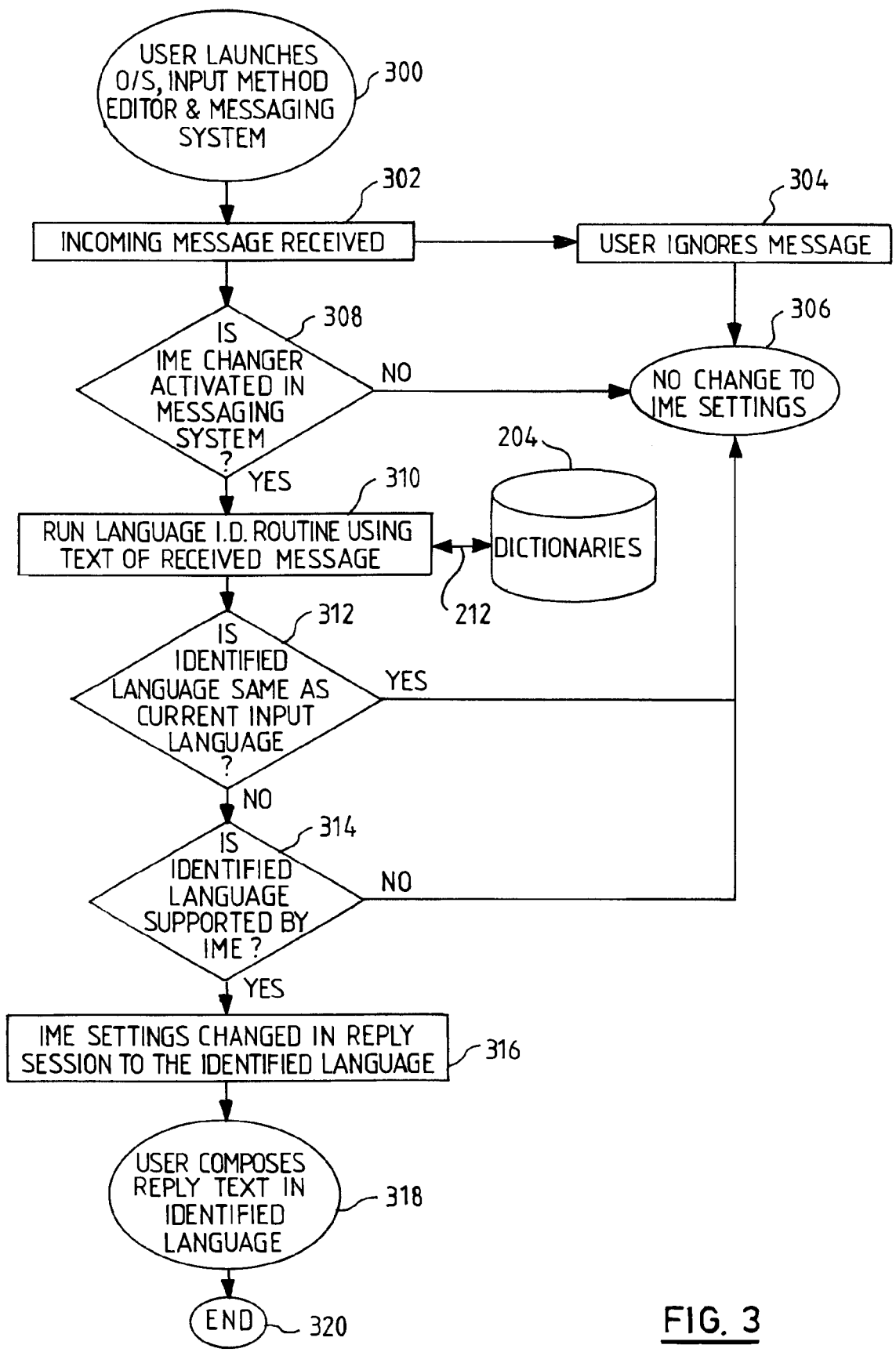
FIG. 3 shows a flowchart of the function of the system of FIG. 2.

The function of the system according to a preferred embodiment will now be described with reference to FIG. 3, in relation to an the example where the messaging application is an instant messaging (IM) application.

On start-up of the user's computer the OS of the processing device launches 300 and a number of other applications, such as a messaging application and an IME application, may also launch automatically, or the user may select these applications for launch manually. When an IM application is launched it will detect (via a configuration settings file or similar) any IME systems that are installed on the operating system and what language input(s) the user has selected as options. Typically, when an IME is running, an application toolbar or perhaps a single icon, which the user can use to interact with the IME, will be presented to the user. The processing device also has installed thereon a multi-lingual language identification dictionary 204, such as the IBM® LanguageWare dictionary, which currently supports 34 languages.

When an incoming text message is received 302 one or more actions, such as the appearance of a messaging window, will alert the user. The particular actions depend on user-defined alerting options. If the user simply ignores the incoming message 304, which may include closing or deleting the received message, then no change is made to the IME settings 306. If the user indicates an intention to reply to the message, for example by opening a reply window or moving the cursor into a text input box, then the device checks whether the automatic IME changing function is activated in the IM application 308. If not, then no automatic changes to the IME settings are made and the user may reply to the message using standard IM functionality. In some embodiments the IME changing function is automatically and/or always activated. In a modification, the device may immediately start language identification rather than waiting for the user to indicate an intention to reply to the received message.

If the function is turned on, all or part of the text of the received message 208 is passed 210 to the language identification component 200, which may be provided by a LanguageWare API, for example. The language identification component 200 analyses 310 the received text 208. This may comprise parsing the whole message or part of the message, such as the first 50-100 or so characters of the text it receives, and using 212 the one or more dictionaries 204 to look for matches between characters, words, or fragments of words, in the received text and characters, words or entries in the dictionaries. This component may use any known language identification technique, such as that described in U.S. Pat. No. 6,292,772 "Method for identifying the language of individual words".

There are two main techniques for the automatic identification of the language of a text document: word-based language identification on the one hand and N-gram-based identification on the other. Both methods work well on long texts, while N-grams are considered to be more robust for shorter texts.

The word-based language identification technique uses the fact that every language has a set of commonly occurring words. Intuitively, a sentence containing the words 'and', 'the', 'in', would most probably be English, whereas a sentence with the word 'der' would be more likely to be German. In an implementation of this technique, the dictionaries comprise a separate lexicon for each possible language, and each word in the sample text is looked up to see in which lexicon it falls. The lexicon that contains the most words from the sample indicates which language was used. Weighted sum can be used, if words are provided with a score.

The second language modelling technique is based on character N-grams (sequences of N consecutive characters), where N ranges typically from 2 to 5. Similarly to the common words technique, this technique assembles a language model from a corpus of documents in a particular language; the difference being that the model consists of character N-grams instead of complete words.

When the language identification component identifies the language of the received text, it indicates 214 the language identified, say 'X', to the controller 202. The controller queries 216 the IME for the input language currently associated with the messaging application, which will typically be the default language of the system, and checks 312 whether it is different to the identified language. If different to 'X', the controller tells 218 the IME to switch its input language to 'X'. The controller may already be aware of the current input language of the IME, in which case query 218 is not required. The controller may also carry out checks 314 to see that the language identified is one supported by the IME or by the default system settings of the OS.

In response to instruction 218, the input language mode of the IME switches, step 316, to language 'X' so that when the user enters text in the text input box of the dialogue window to compose a response, step 318, the text appears in the same language as that of the incoming message. The user does not have to make any manual alterations to the language settings of their data processing system or IME.

When the user exits the text input box and moves back to interact with any other application running on the processing device, the IME mode automatically changes back to the language selected in respect of the other application. In the Microsoft Windows® environment, each application window can have its own IME setting, which means that at a particular time different windows can have different IME settings. That is, with a single IME running on a computer system, a plurality of applications may be running, with associated application windows, each with different IME settings. In the preferred embodiment, language settings for the IME in the message dialogue window are automatically changed according to the identified language of the incoming text message.

There would be an option in the message application settings where users can choose to not use this language change functionality, so that the input method would remain default even if the incoming text is in a different language. If this functionality is deselected, step 308 will find that it is not activated and processing steps 310 to 318 will not take place.

The process of inputting text using an IME will now be explained using Japanese as an example. Japanese text input is divided into three phases: conversion or transliteration; dictionary lookup; and candidate selection.

First, a user inputs Latin characters that correspond to Kana characters. As each Latin character is typed the IME automatically converts them into either Hiragana or Katakana characters. For example, if the Latin letters 'ame' are typed, the Hiragana letters あめ are obtained.

Next, a conversion dictionary takes Kana characters as input and converts them into suitable mixtures of Kanji and Kana characters. The dictionary uses a key, which is commonly known as a 'reading', or phonetic pronunciation, to find acceptable replacement Kanji characters. Typically, each reading or key may have several Kanji associated to it. In addition, many Kanji may have multiple readings. For example, the Kanji character for 'rain' 雨 has two possible readings あめ Latin letters 'ame' or う Latin letter 'u'.

During the candidate selection phase, the user is presented with a list of Kanji/Kana characters to select after a sequence of Kana characters has been input. The list of replacements is typically prioritized by most frequent use.

After the user selects a candidate from the candidate list (by either typing the number of the choice, navigating to the choice with the arrow keys or by clicking the choice with the mouse), the characters are automatically inserted into the application. For convenience, most IMEs automatically insert the most frequently used replacement into the application. If the IME selects an incorrect replacement, the user can force a replacement list to be displayed. Once the character or characters have been selected, the entry process starts over again.

Preferred embodiments of the present invention thus automate the switching of the IME settings in respect of the input of a reply to a message in a language which is different to the default language IME setting. This makes the system more user-friendly and speeds up the process of composing a reply in the same language as that of received message.

Insofar as embodiments of the invention described are implementable, at least in part, using a software-controlled programmable processing device or, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention. For example, the messaging application may be any application for sending and receiving text messages, such as an email messaging system, and may use any message transfer protocol.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims, is not to be construed as meaning "consisting only of".

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A method for composing a reply to a text message received in a messaging application in a system including an input method editor, wherein the input method editor has an independent input language setting for each individual one of a plurality of applications including the messaging application, the method comprising:

identifying the language of a received text message by comparing text contents of the received text message to at least one dictionary to find matches between sets of characters in the text contents of the received text message and corresponding individual entries in the dictionary, and wherein the identifying of the language of the received text message is responsive to a total number of matches found;

comparing the identified language to a current input language setting associated with the messaging application in the input method editor;

leaving the input language setting associated with the messaging application in the input method editor as a default language for the system responsive to the user deleting the received message;

automatically changing the input language setting associated with the messaging application in the input method editor to the identified language responsive to a user of the messaging application indicating an intention to reply to the received text message by opening a reply window for input of a reply to the received message;

detecting that the user of the messaging application has exited the messaging application and begun interacting with another application program; and in response to detecting that the user of the messaging application has exited the message application and begun interacting with the other application program, automatically changing the input language of the input method editor to an input language associated with the other application program in the input method editor.

2. The method according to claim 1, further comprising receiving user inputs indicating text characters of a reply message.

3. The method according to claim 2, further comprising converting the received user inputs into text characters of the identified language.

4. The method according to claim 1, further comprising determining whether the identified language of the received text message is a language supported by the input method editor.

5. A system for composing a reply to a text message received in a messaging application, the system comprising:

a language identifying component for receiving text of a received message and identifying the language of the received message by comparing text contents of the received text message to at least one dictionary to find matches between sets of characters in the text contents of the received text message and corresponding individual entries in the dictionary, and wherein the identifying of the language of the received text message is responsive to a total number of matches found;

an input method editor for converting received user inputs into text characters, wherein the input method editor has an independent input language setting for each individual one of a plurality of applications including the messaging application,; and a controller for automatically leaving the input language setting associated with the messaging application in the input method editor as a default language for the system responsive to the user deleting the received message, changing the input language setting associated with the messaging application in the input method editor to the identified language responsive to a user of the messaging application indicating an intention to reply to the received text message by opening a reply window for input of a reply to the received message, detecting that the user of the messaging application has exited the messaging application and begun interacting with another application program, and in response to detecting that the user of the messaging application has exited the message application and begun interacting with the other application program, automatically changing the input language of the input method editor to a language associated with the other application program.

6. The system according to claim 5, further comprising a receiving component for receiving user inputs indicating text characters of a reply message.

7. The system according to claim 6, wherein the input method editor converts received user inputs into text characters of the identified language.

8. The system according to claim 5, wherein the controller determines whether the identified language of the received text message is a language supported by the input method editor.

9. A computer program product including a non-transitory computer readable storage medium, the computer readable storage medium having stored thereon program code for composing a reply to a text message received in a messaging application in a system including an input method editor, wherein the input method editor has an independent input language setting for each individual one of a plurality of applications including the messaging application, the program code comprising:

program code for identifying the language of a received text message by comparing text contents of the received text message to at least one dictionary to find matches between sets of characters in the text contents of the received text message and corresponding individual entries in the dictionary, and wherein the identifying of the language of the received text message is responsive to a total number of matches found;

program code for comparing the identified language to a current input language setting associated with the messaging application in the input method editor;

program code for leaving the input language setting associated with the messaging application in the input method editor as a default language for the system responsive to the user deleting the received message;

program code for automatically changing the input language setting associated with the messaging application in the input method editor to the identified language responsive to a user of the messaging application indicating an intention to reply to the received text message by opening a reply window for input of a reply to the received message;

program code for detecting that the user of the messaging application has exited a text input box of the messaging application and begun interacting with another application program; and program code for, in response to detecting that the user of the messaging application has exited the text input box of the message application and begun interacting with the other application program, automatically changing the input language of the input method editor to an input language associated with the other application program in the input method editor.

* * * * *